United States Patent
Han et al.

(10) Patent No.: US 7,711,787 B2
(45) Date of Patent: May 4, 2010

(54) ON-CHIP NETWORK INTERFACING APPARATUS AND METHOD

(75) Inventors: Jin Ho Han, Daejeon (KR); Young Hwan Bae, Daejeon (KR); Han Jin Cho, Daejeon (KR); Jun Young Chang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1013 days.

(21) Appl. No.: 11/300,731

(22) Filed: Dec. 14, 2005

(65) Prior Publication Data

US 2006/0146811 A1    Jul. 6, 2006

(30) Foreign Application Priority Data

Dec. 15, 2004  (KR)  ...................... 10-2004-0106491
Jul. 13, 2005  (KR)  ...................... 10-2005-0063265

(51) Int. Cl.
G06F 15/16  (2006.01)
(52) U.S. Cl. ....................... 709/209; 709/250; 370/389; 719/313
(58) Field of Classification Search ................. 709/250; 370/389; 719/313
See application file for complete search history.

(56) References Cited

U.S. PATENT DOCUMENTS

| 6,687,773 B1 * | 2/2004 | Stewart et al. ................. 710/65 |
| 2004/0017807 A1 * | 1/2004 | Dorr et al. .................... 370/389 |
| 2006/0095920 A1 * | 5/2006 | Goossens .................... 719/313 |

FOREIGN PATENT DOCUMENTS

KR  1020040032376  4/2004

OTHER PUBLICATIONS

Lee et al; An 800MHz Star-Connected On-Chip Network for Application to Systems on a Chip; 2003 IEEE Internation Solid State Circuits Conference.*
"A Distributed Crossbar Switch Scheduler for On-Chip Networks", K. Lee, et al., Semiconductor System laboratory, Dept. of Electrical Engineering, KAIST, 4 pages.
"An 800MHz Star-Connected On-Chip Network for Application to Systems on a Chip", S. Lee, et al., 2003 IEEE International Solid-State Circuits conference, 2 pages.

* cited by examiner

Primary Examiner—Hassan Phillips
Assistant Examiner—Glenford Madamba
(74) Attorney, Agent, or Firm—Blakely, Sokoloff, Taylor & Zafman

(57) ABSTRACT

An on-chip network interfacing apparatus and method are provided. The apparatus includes a plurality of on-chip network ports; a switch receiving data from a first on-chip network port of the on-chip network ports and transmitting the received data to a second on-chip network port of the on-chip network ports; and an interface unit interfacing an advanced microcontroller bus architecture (AMBA) signal received from a module, which is designed according to an AMBA on-chip bus protocol, and outputting the interfacing result to the first on-chip network port; and interfacing the on-chip network signal received from the first on-chip network port, and outputting the interfacing result to the module. Accordingly, it is possible to establish communications at increased speeds by interfacing a signal according to the AMBA 2.0 on-chip bus protocol with a signal according to the on-chip network protocol.

22 Claims, 8 Drawing Sheets

ON-CHIP NETWORK INTERFACING APPARATUS AND METHOD

This application claims the priorities of Korean Patent Application No. 10-2004-0106491, filed on Dec. 15, 2004 and Korean Patent Application No. 10-2005-0063265, filed on Jul. 13, 2005, in the Korean Intellectual Property Office, the disclosures of which are incorporated herein in their entirety by reference.

BACKGROUND OF THE INVENTION

1. Field of the Invention

The present invention relates to an on-chip network interfacing apparatus and method, and more particularly, to an on-chip network interfacing apparatus that includes an interface circuit that establishes communications among modules designed according to an advanced microcontroller bus architecture (hereinafter, referred to as "AMBA") 2.0 on-chip bus protocol and an on-chip network device designed according to an on-chip network protocol, and a method therefor.

2. Description of the Related Art

In general, the AMBA 2.0 on-chip bus protocol is often used to establish communications between on-chip circuits. FIG. 1 is a block diagram illustrating the structure of a conventional AMBA 2.0 on-chip bus that is designed according to the AMBA 2.0 on-chip bus protocol. Referring to FIG. 1, the AMBA 2.0 on-chip bus allows a master module 110 to communicate with a slave module 120. The master module 110 includes first through third master modules 111 through 113, and the slave module 120 includes first through fourth slave modules 121 through 124. Here, the master module 110 is a module that requests data for communications and the slave module 120 is a module that is requested to provide the communications data. Thus, the master module 110 transmits only read/write request signals, and the slave module 120 transmits read data/write data in response to the read/write request signals.

The AMBA 2.0 on-chip bus of FIG. 1 includes an arbiter 130, a decoder 140, a read data multiplexer 170 that allows the master module 110 to request the read data and the slave module 120 to transmit the read data, a write data multiplexer 160 that allows the master module 110 to request the write data and the slave module 120 to transmit the write data, and an address and control multiplexer 150 that allows the master module 110 to transmit control/address information to the slave module 120.

The master module 110 transmits a request signal for use of the AMBA 2.0 on-chip bus to the arbiter 130.

The arbiter 130 sets an order in which the AMBA 2.0 on-chip bus is to be used by the modules of the master module 110. Request signals output from the modules of the master module 110 are connected to a plurality of input terminals of the arbiter 130, and thus, the arbiter 130 sequentially receives the request signals in a set order. The arbiter 130 gives priority over use of the AMBA 2.0 on-chip bus to the modules of the master module 110 according to the set order. The master module that acquires a right of the AMBA 2.0 on-chip bus, communicates with one of the modules of the slave module 120 via the address and control multiplexer 150 and the read data multiplexer 170, or via the address and control multiplexer 150 and the write data multiplexer 160. The slave module to be communicated with is determined by the decoder 140.

However, the AMBA 2.0 on-chip bus experiences a bandwidth limitation when exchanging data between the master module 110 and the slave module 120, which is caused due to physical sharing of a wire. When a physical bus is occupied by a master module, the other master modules cannot establish communications in the AMBA 2.0 on-chip bus.

To solve these problems, an on-chip network protocol will be described in greater detail with reference to FIG. 2.

FIG. 2 is a block diagram of a conventional on-chip network apparatus designed according to an on-chip network protocol. Referring to FIG. 2, the on-chip network apparatus includes a plurality of first on-chip network ports 210, and a switch 220. Each of the first on-chip network ports 210 includes an up sampler 212 that transmits on-chip network signals received from a plurality of first modules 250, which are designed according to the on-chip network protocol, to the switch 220 in the order that the on-chip network signals were received; and a down sampler 214 that transmits the on-chip network signals received from the switch 220 to the first modules 250 in the reverse order that the on-chip network signals were received. The on-chip network apparatus of FIG. 2 is designed to solve a problem that a master module has to wait when a grant for use of an AMBA 2.0 on-chip bus is given to another master module. Specifically, when there are many master modules that simultaneously request use of the AMBA 2.0 on-chip bus to communicate with different slave modules, the on-chip network apparatus of FIG. 2 allows the master modules to simultaneously communicate without waiting for a grant for use of the bus. Even if they want to communicate with the same slave module, the on-chip network apparatus of FIG. 2 makes it possible by dividing desired data into predetermined units.

The switch 220 is a physical medium that delivers a signal, which is transmitted to the first module 250 from the first on-chip network ports 210, to a plurality of second on-chip network ports 210'.

In the on-chip network apparatus of FIG. 2, even while the first module 250 uses a network, a plurality of second on-chip network ports 250' can use the network without requesting use of the network and waiting for a grant for use. This is because data is transmitted in packet units. That is, since the first and second modules 250 and 250' are connected to the switch 220, which collects packets and send them to a target destination, via different media, data from the first modules 250 is transmitted to the network in packet units irrespective of the amount of the data. Also, each packet to be transmitted contains a tag that specifies a destination, a departure place, and the characteristics of the packet. Accordingly, even if packets generated by different systems are mixed, it is possible to sequentially transmit the packets to their target destinations by decoding the tags contained in the packets. The switch 220 decodes the tags contained in packets and sequentially transmits the packets to their destinations.

The construction of the switch 220 will now be described in greater detail with reference to FIG. 3. FIG. 3 is a detailed block diagram of the switch 220 illustrated in FIG. 2. Referring to FIG. 3, the switch 220 includes a plurality of in-ports 222, a plurality of arbiters 224, and a switch fabric 226.

Each of the in-ports 222 queues incoming data from a corresponding arbiter 224 and transmits a request signal for use of the switch fabric 226 to the corresponding arbiter 224. The arbiter 224 receives the request signal from the in-port 222 and transmits a signal granting the use of the switch fabric 226 to the in-port 222. The switch fabric 226 outputs the data received via the in-port 222.

More specifically, the switch 220 receives packets, which are to be transmitted to different destinations, via the in-ports 222. The received packets are sent to their destinations via the switch fabric 226. Each of in-ports 222 is connected to all of the destinations via the switch fabric 226. The in-port 222 decodes a tag from a packet and sends a request signal for use of the switch fabric 226 to the arbiter 224. When the switch fabric 226 is unoccupied, the arbiter 224 accepts the request for use of the switch fabric 226 and sends the packet stored in the in-port 222 to the switch fabric 226. Accordingly, it is possible to simultaneously transmit packets corresponding to the arbiters 224 to the destinations of the packets. However, while the arbiter 224 is in use, the packets are queued in the in-port 222. In this case, until a master module completes all desired operations, the packets stand by in the in-ports 222 similar to a bus but the number of the packets is less than that of packets that stand by to receive a grant for use of the bus. However, since most conventional modules are designed according to the AMBA 2.0 on-chip bus protocol, an interface circuit must be installed between each conventional module and an on-chip network so as to establish communications via the on-chip network.

SUMMARY OF THE INVENTION

The present invention provides an on-chip network interfacing apparatus that includes an interface circuit to establish communications among modules designed according to the AMBA 2.0 on-chip bus protocol and an on-chip network apparatus designed according to the on-chip network protocol, and a method therefor.

According to an aspect of the present invention, there is provided an on-chip network protocol communications apparatus, the apparatus including a plurality of on-chip network ports; a switch receiving data from a first on-chip network port of the on-chip network ports and transmitting the received data to a second on-chip network port of the on-chip network ports; and an interface unit interfacing an advanced microcontroller bus architecture (AMBA) signal received from an module, which is designed according to an AMBA on-chip bus protocol, and outputting the interfacing result to the first on-chip network port; and interfacing the on-chip network signal received from the first on-chip network port, and outputting the interfacing result to the module.

According to another aspect of the present invention, there is provided a method of establishing communications between a master module which is designed according to an advanced microcontroller bus architecture (AMBA) on-chip bus protocol and requests data for communications, and an on-chip network, the method comprising controlling a forward signal by receiving an AMBA signal from the master module, interfacing the AMBA signal with an on-chip network signal, and outputting the interfacing result to the on-chip network; and controlling a backward signal by receiving an on-chip network signal from the on-chip network, interfacing the on-chip network signal with an AMBA signal, and outputting the interfacing result to the master module.

According to another aspect of the present invention, there is provided a method of establishing communications between an on-chip network, and a slave module which is designed according to an advanced microcontroller bus architecture (AMBA) on-chip bus protocol and which receives a request for data required for the communications, the method comprising controlling a forward signal by receiving an on-chip network signal from the on-chip network, interfacing the on-chip network with an AMBA signal, and outputting the interfacing result to the slave module; and controlling a backward signal by receiving an AMBA signal from the slave module, interfacing the AMBA signal with an on-chip network signal, and outputting the interfacing result to the on-chip network.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
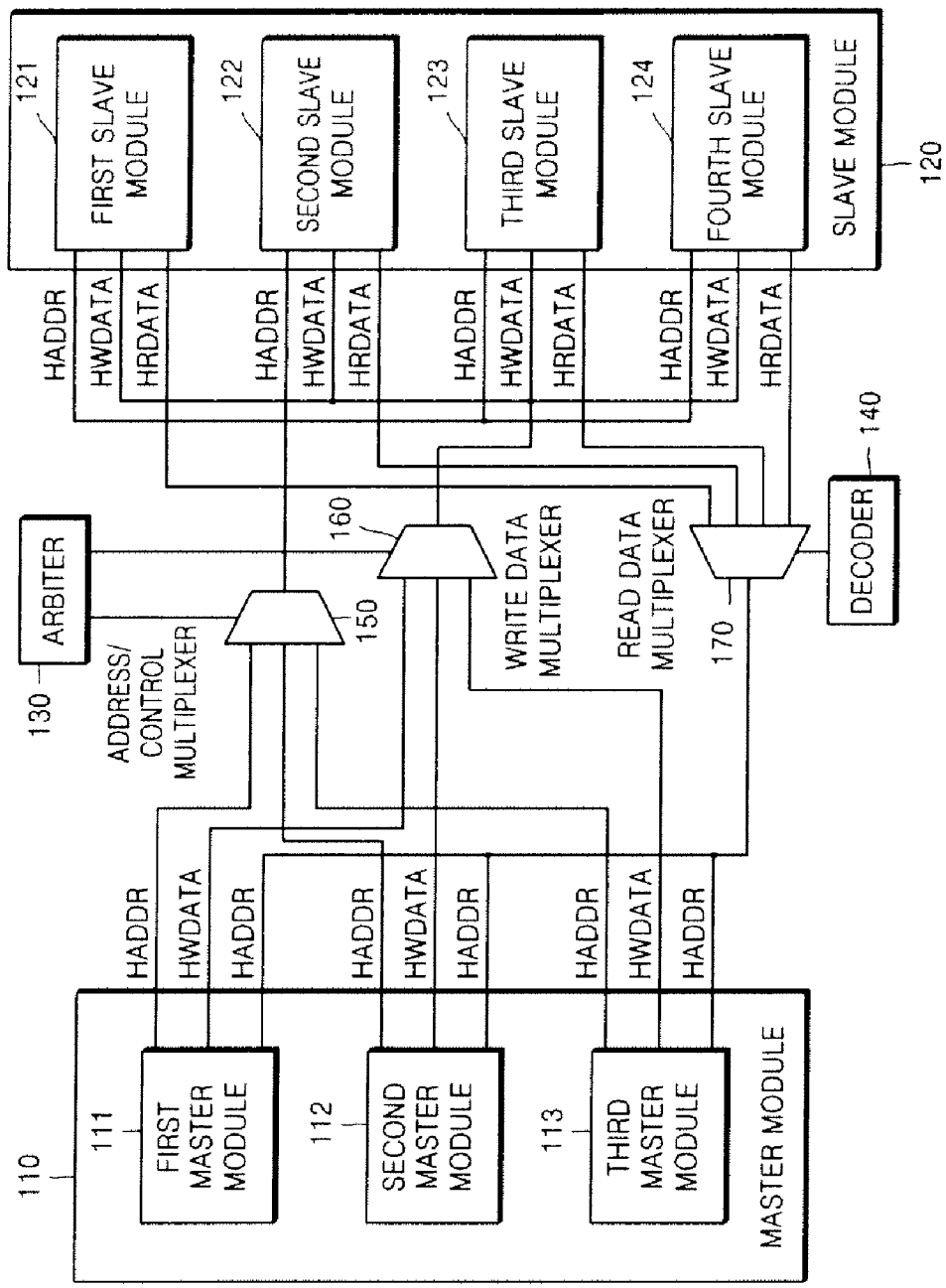
FIG. 1 is a block diagram of a conventional AMBA 2.0 on-chip bus designed according to the AMBA 2.0 on-chip bus protocol.
Figure 2:
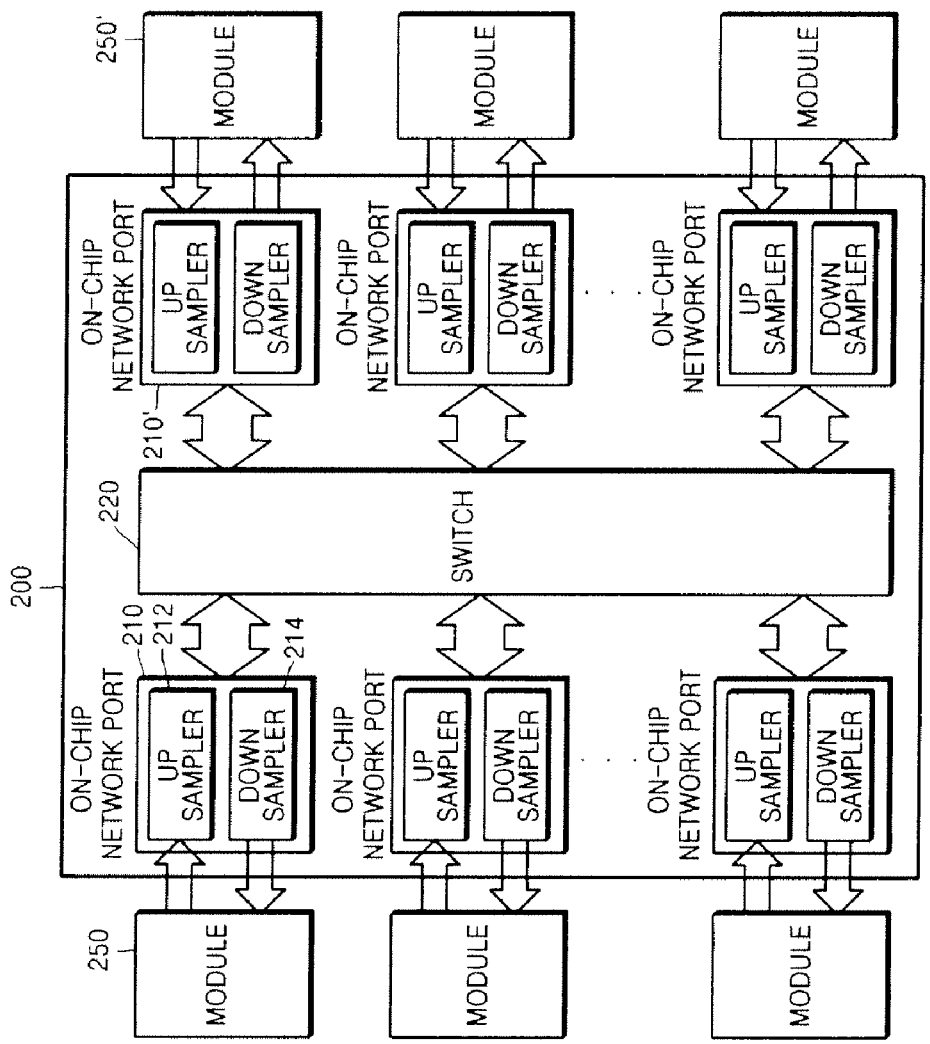
FIG. 2 is a block diagram of a conventional on-chip network apparatus designed according to the on-chip network protocol.
Figure 3:
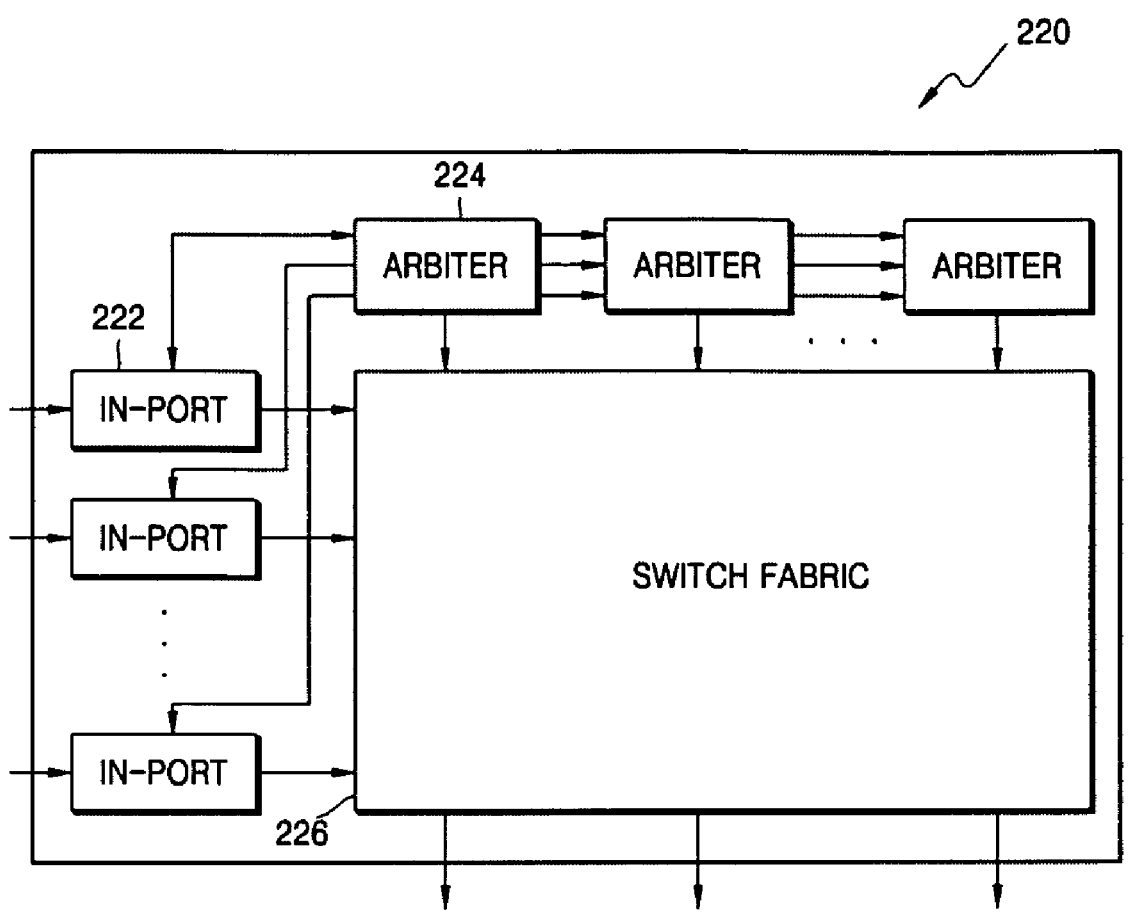
FIG. 3 is a detailed block diagram of a switch illustrated in FIG. 2.
Figure 4:
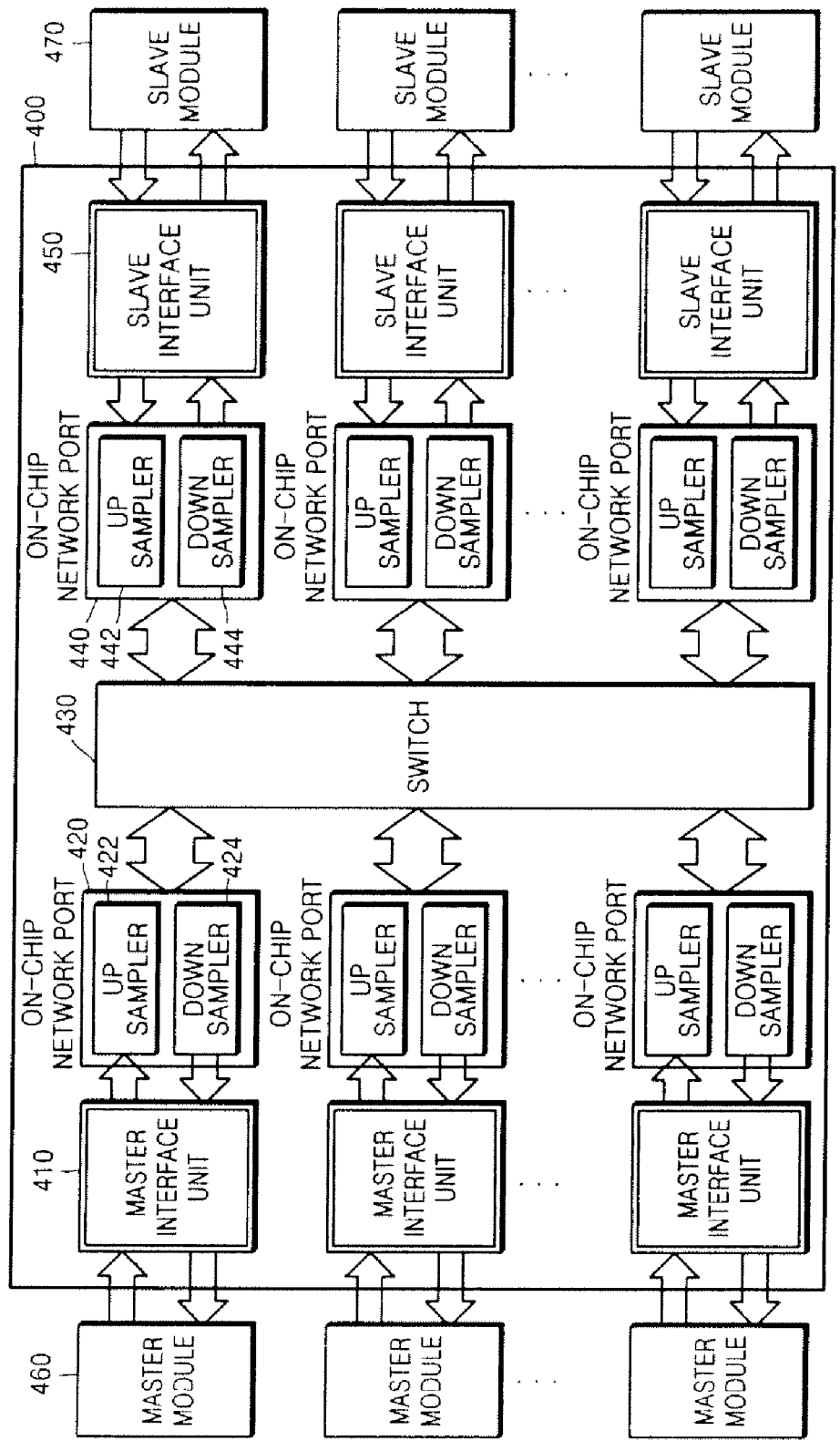
FIG. 4 is a block diagram of an on-chip network apparatus having interface units according to an embodiment of the present invention.

FIG. 4 is a block diagram of an on-chip network apparatus 400 with a plurality of interface units according to an embodiment of the present invention. Referring to FIG. 4, the on-chip network apparatus 400 includes a plurality of master interface units 410, a plurality of on-chip network (OCN) ports 420 connected to corresponding master interface units 410, a switch 430, a plurality of slave interface units 450, and a plurality of on-chip network ports 440 connected to corresponding slave interface units 450.

Each of the master interface units 410 performs an interface between the corresponding OCN port 420 and a corresponding master module 460 that is designed according to the AMBA 2.0 on-chip bus protocol. That is, the master interface unit 410 interfaces an AMBA signal received from the master module 460 with an OCN signal received from the OCN port 420 and outputs the interfacing result to the OCN port 420, and interfaces the OCN signal with the AMBA signal and outputs the interfacing result to the master module 460.

Table 1 illustrates the types of OCN signals and AMBA signals transmitted in the master interface unit 410 that performs an interface between the OCN port 420 and a master module 460 that is designed according to the AMBA 2.0 on-chip bus protocol. However, the types of the OCN signals and the AMBA signals are not limited.

Referring to Table 1, the OCN signals include forward signals whose names begin with "F", except an FHOLDMS signal, and which are input to the OCN port 420; backward signals whose names begin with "B" and which are output from the OCN port 420; and the FHOLDMS signal. The AMBA signals include an HREADY signal and a HRDATA signal to be input to the master module 460, and the other signals to be output from the master module 460.

TABLE 1

| | Name | Function |
|---|---|---|
| OCN Signal | FHOLDMS | Prevent master module from transmitting additional data to OCN port |
| | FAEN | Notify that FA[3:0] signal is ready |
| | FA[31:0] | Provide forward address at which data is to be written or read |
| | FDEN | Notify that FD[31:0] signal is ready |
| | FD[31:0] | Provide forward data |
| | FWRITE | Indicate whether write operation/read operation is being performed in current data communications |
| | FBST[1:0] | Provide burst mode and length information |
| | FSEN | Notify that FS[31:0] signal is ready |
| | FS[31:0] | Used to transmit various control signals regarding burst length information and read/write operation, for example, according to module characteristics for data communications |
| | BDEN | Notify that BD[31:0] signal is ready |
| | BD[31:0] | Provide backward data |
| AMBA Signal | HBURSREQ | Request use of bus |
| | HTRANS[1:0] | Indicate transmission mode |
| | HWRITE | Indicate whether write operation or read operation is being performed in current data communications |
| | HBURST[2:0] | Provide burst mode and length information |
| | HADDR[31:0] | Provide address |
| | HWDATA[31:0] | Provide write data to be transmitted from master module to slave module via OCN |
| | HREADY | Notify that slave module is ready to transmit data. This signal is transmitted to master module via OCN port |
| | HRDATA[31:0] | Provide data that is read and transmitted from slave module via OCN port |

The slave interface unit 450 performs an interface between the OCN port 440, and a slave module 470 designed according to the AMBA 2.0 on-chip bus protocol. That is, the slave interface unit 450 interfaces an OCN signal received from the OCN port 440 with an AMBA signal and outputs the interfacing result to the slave module 470, and interfaces the AMBA signal with the OCN signal and outputs the interfacing result to the OCN port 440.

Table 2 illustrates the types of OCN signals and AMBA signals transmitted in the slave interface unit 450 that performs an interface between the OCN port 440 and the slave module 470 designed according to the AMBA 2.0 on-chip bus protocol. However, the types of the OCN signal and the AMBA signal are not limited.

Here, the OCN signals include forward signals whose names begin with "F", except an FHOLDSNI signal and which are input to the OCN port 440; backward signals whose names begin with "B" and which are output from the OCN port 440; and the FHOLDSNI signal. The AMBA signals include an HREADY signal and an HRDATA signal that are input to the slave module 470, and the other signals output from the slave module 470.

TABLE 2

| | Name | Function |
|---|---|---|
| OCN Signal | FHOLDMSNI | Prevent OCN port from transmitting data when slave IP module cannot process input data. |
| | FAEN | Notify that FA[31:0] signal is ready |
| | FA[31:0] | Provide forward address at which data is to be written or read |
| | FDEN | Notify that FD[31:0] signal is ready |
| | FD[31:0] | Provide forward data |
| | FSEN | Notify that FS[3:0] signal is ready |
| | FS[3:0] | Used to transmit various control signals regarding burst length information and read/write operation, for example, according to IP characteristics for data communications |
| | FTEN | Notify that FT[12:0] signal is ready |
| | FT[12:0] | Forward tag signal. Interface module requires tag indicating the destination, departure place, and characteristics of packet. OCN port receives tag information required to make packet for transmitting BD[31:0] signal, using FT[12:0] signal. Slave interface module stores value of FT[12:0] signal and uses FT[12:0] signal to transmit value of BD[31:0] signal to OCN port. |
| | BHOLDSL | Prevent slave IP module from transmitting data when OCN port cannot process signal output from slave IP module. |
| | BDEN | Notify that BD[31:0] signal is ready |
| | BD[31:0] | Provide backward data |
| | BTEN | Notify that BT[12:0] signal is ready |
| | BT[12:0] | Backward tag signal. Interface module requires tag indicating the destination, departure place, and characteristics of packet. OCN port receives tag information required to make packet for transmitting BD[31:0] signal, using BT [12:0] signal. Slave interface module stores value of BT[12:0] signal and uses BT[12:0] signal to transmit value of BD[31:0] signal to \ OCN port. |
| AMBA Signal | HSEL | Operate slave IP module. |
| | HWRITE | Indicate whether write operation or read operation is being performed in current data communications |
| | HADDR[31:0] | Provide address |
| | HWDATA[31:0] | Provide write data to be transmitted from master IP module to slave IP module via OCN port |
| | HREADY | Notify that slave IP module cannot process input data. This signal is output from slave IP module. |
| | HRDATA[31:0] | Provide write data that is read and transmitted from slave IP module to master IP module via OCN port |

The switch 430 is a physical medium that transfers signals between each OCN port 420 and each OCN port 440, respectively.

Each OCN port 420 connected to the corresponding master interface unit 410 includes an up sampler 422 that transmits data received from the master interface unit 410 to the switch 430 in the order that the data was received; and a down sampler 424 that transmits the data received from the switch 430 to the master interface unit 410 in the reverse order that the data was received.

Also, each OCN port 440 connected to the corresponding slave interface unit 450 includes an up sampler 442 that transmits data received from the slave interface unit 450 to the switch 430 in the order that the data was received; and a down sampler 444 that transmits data received from the switch 430 to the slave interface unit 450 in the reverse order that the data was received.

Figure 5:
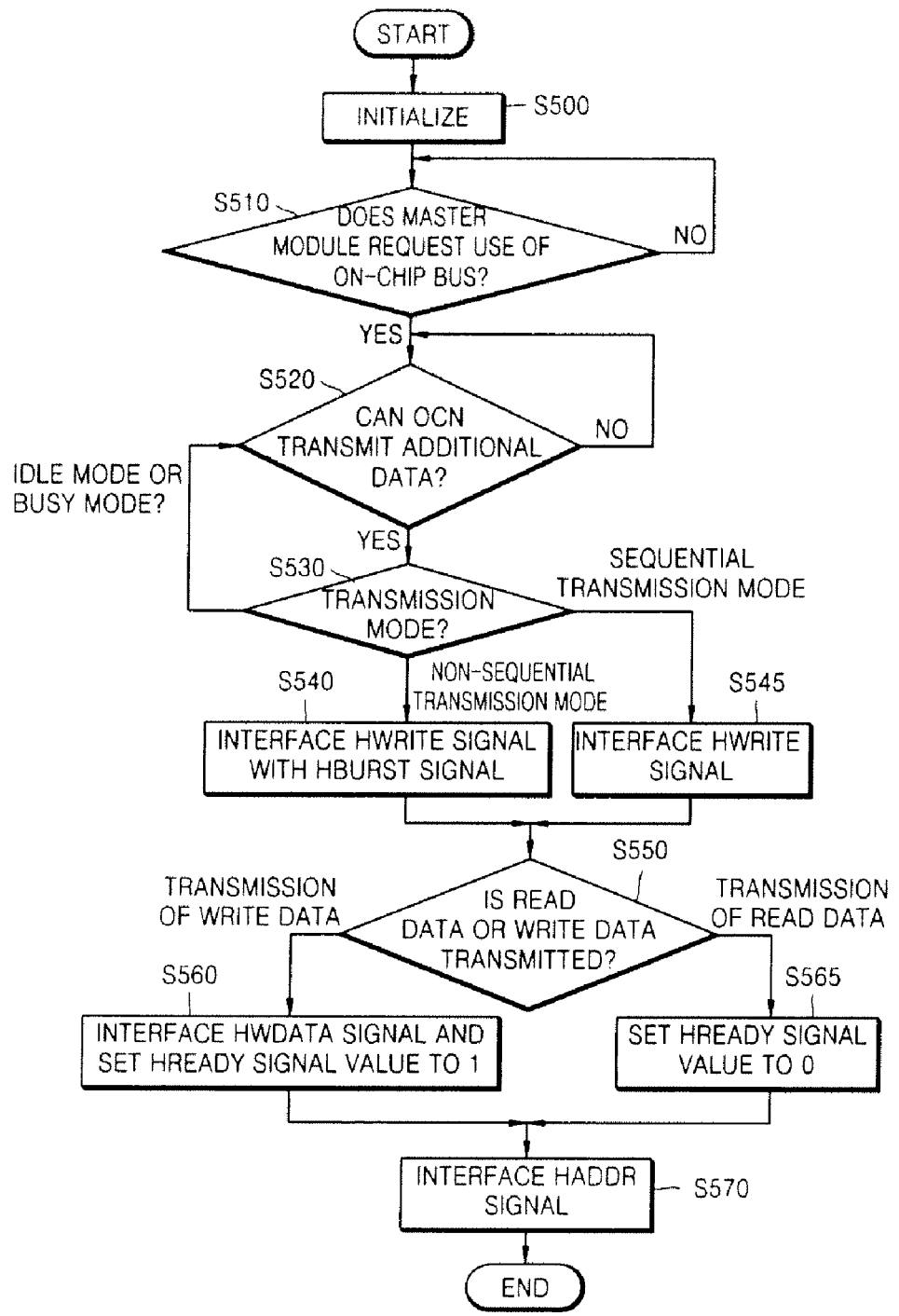
FIG. 5 is a flowchart illustrating a forward interfacing method performed by a master interface unit, according to an embodiment of the present invention.

FIG. 5 is a flowchart illustrating a forward interfacing method performed by a master interface unit, according to an embodiment of the present invention. Signals to be described with respect to FIG. 5 have been described in Table 1. Referring to FIG. 5, an FSEN signal, a FAEN signal, and an FDEN signal, which are forward signals, and an HREADY signal which is an AMBA signal are initialized (S500). Here, the FSEN signal, the FAEN signal, and the FDEN signal are initialized to a logic "0" level, and the HREADY signal is initialized to a logic "1" level.

Next, it is determined whether a master module requests use of an on-chip bus by checking whether an HBUSREQ signal is at a logic "1" level (S510).

When it is determined in operation S510 that the master module does not request use of the on-chip bus, that is, when the HBUSREQ is at a logic "0" level, operation S510 is performed again. When it is determined in operation S510 that the master module requests use of the on-chip bus, that is, when the HBUSREQ signal is at a logic "1" level, it is determined whether an OCN can transmit additional data by checking whether an FHOLDMS signal is at a logic "0" level (S520).

If it is determined in operation S520 that the OCN cannot transmit the additional data, that is, an FHOLDMS signal is at a logic "1" level, operation S520 is performed again. If it is determined in operation S520 that the OCN can transmit the additional data, that is, the FHOLDMS signal is at a logic "0" level, an HTRANS signal is received from the master module and a current transmission mode is determined (S530). The HTRANS signal can indicate four transmission modes. When a current transmission mode is an IDLE mode or a BUSY mode, operation S530 is performed again. When it is determined in operation 5530 that the current mode is a non-sequential mode, operation S540 is performed, and when it is determined in operation S530 that the current mode is a sequential mode, operation S545 is performed. In the non-sequential mode, a HBURST signal indicating a transmission manner and an HWRITE signal are received from the master module, and in the sequential mode, the HWRITE signal is received from the master module.

In operation S540, the received HBURST signal and HWRITE signal are interfaced with an FS signal which is an OCN signal and the interfacing result is output to the OCN.

In operation S54, the received HWRITE signal is interfaced with an FS signal which is an OCN signal and the interfacing result is output to the OCN.

Next, it is determined from the received HWRITE signal whether the write data or read data is transmitted by checking whether the HWRITE signal is at a logic "0" level or a logic "1" level (S550).

If it is determined in operation S550 that write data is transmitted, that is, the HWRITE signal is at a logic "1" level, operation S560 is performed. If it is determined in operation S550 that read data is transmitted, that is, that the HWRITE signal is at a logic "0" level, operation S565 is performed.

In operation S560, an HWDATA signal is received from the master module and interfaced with an FD signal which is an OCN signal, and the interfacing result is output to the OCN. Also, in operation S560, an HREADY signal is set to a logic "1" level.

In operation S565, the HREADY signal is set to a logic "0" level until the read data is received.

After operations S560 and S565, an HADDR signal is received from the master module and interfaced with the FA signal which is an OCN signal, and the interfacing result is output to the OCN (S570).

Forward interfacing performed by a master interface unit, according to an embodiment of the present invention, which is not described with reference to FIG. 5, has been described with reference to FIG. 4.

Figure 6:
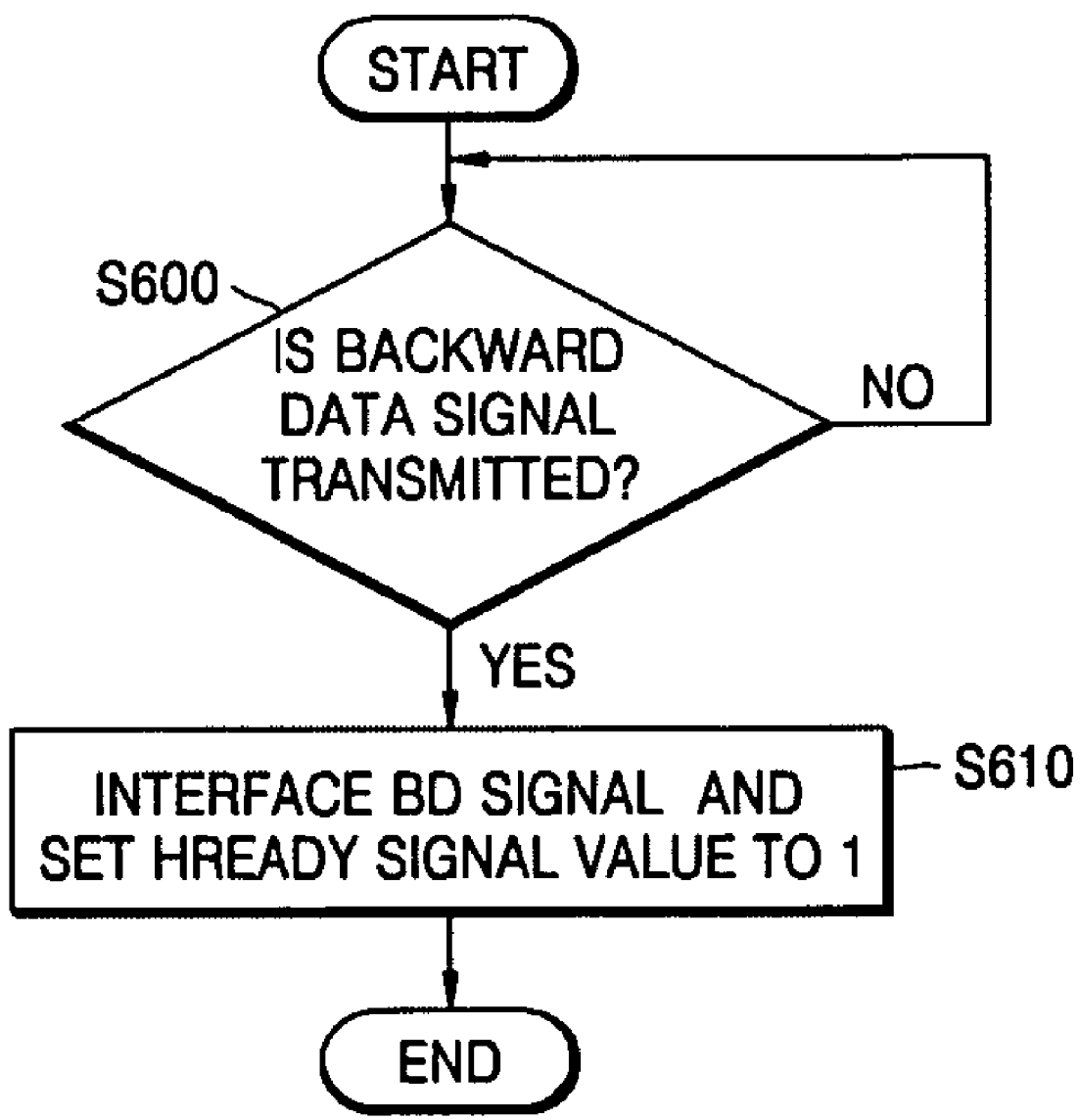
FIG. 6 is a flowchart illustrating a backward interfacing method performed by a master interface unit, according to an embodiment of the present invention.

FIG. 6 is a flowchart illustrating a backward interfacing method performed by a master interface unit, according to an embodiment of the present invention. Referring to FIG. 6, it is determined whether a BD signal, which is a backward data signal, is received (S600).

If it is determined in operation S600 that the BD signal is received, the BD signal is interfaced with an HWDATA signal which is an AMBA signal, and the interfacing result is transmitted to the master module (S610). Also, in operation S610, an HREADY signal is set to a logic "1" level.

If it is determined in operation S600 that a BD signal is not received, operation S600 is performed again.

Backward interfacing performed by a master interface unit, according to an embodiment of the present invention, which is not described with reference to FIG. 6, has been described with reference to FIG. 4.

Figure 7:
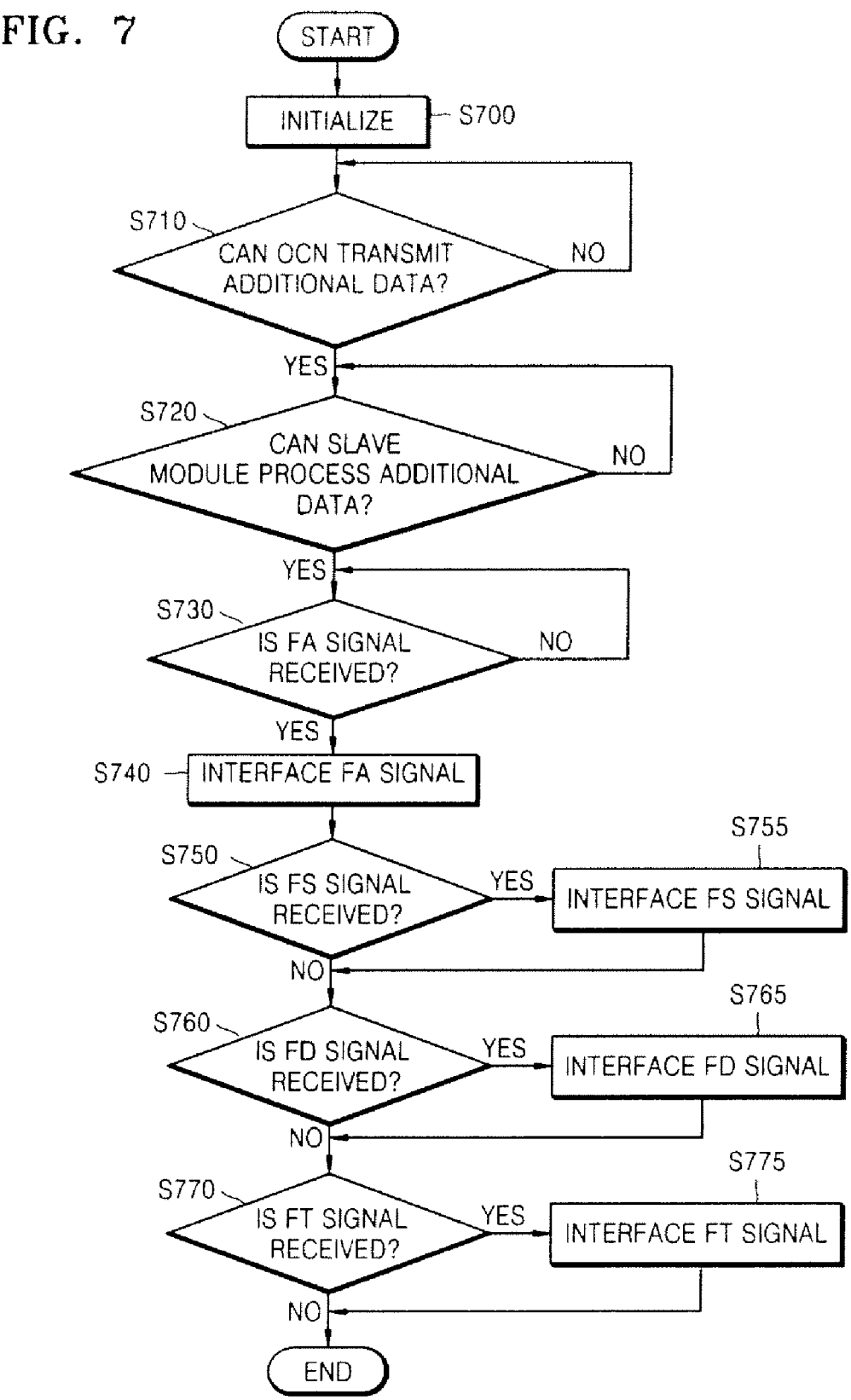
FIG. 7 is a flowchart illustrating a forward interfacing method performed by a slave interface unit, according to an embodiment of the present invention.

FIG. 7 is a flowchart illustrating a forward interfacing method performed by a slave interface unit, according to an embodiment of the present invention. Referring to FIG. 7, first, an HWRITE signal, an HWDATA signal, an HADDR signal, an HBURST signal, and an FT_TEMP signal are initialized (S700).

Next, it is determined whether an OCN is capable of transmitting additional data by checking whether a BHOLDSL signal is at a logic "1" level (S710).

It is determined in operation S710 that the BHOLDSL signal is at a logic "1" level, the slave interface unit performs operation S710 again without transmitting additional data to the OCN. If it is determined in operation S710 that the BHOLDSL signal is at a logic "0" level, the slave interface unit determines whether a slave module can receive and process the additional data (S720). It is determined whether the slave module can receive and process the additional data by checking whether an HREADY signal is at a logic "1" level.

If it is determined in operation S720 that the HREADY signal is at a logic "0" level, the slave module cannot receive and process the additional data, and thus, operation S720 is performed again. If it is determined in operation S720 that the HREADY signal is at a logic "1" level, the slave interface unit determines whether an address signal indicating that data is to be written or read at a forward address is received from the OCN (S730). It is determined whether the address signal is received from the OCN by checking whether an FAEN signal is at a logic "1" level. That is, the FAEN signal at a logic "1" level indicates that the address signal is received, and the FAEN signal at a logic "0" level indicates that the address signal is not received.

If it is determined in operation S730 that the FAEN signal is at a logic "0" level, operation S730 is performed again. If it is determined in operation S730 that the FAEN signal is at a logic "1" level, an FA signal received from the OCN is interfaced with an HADDR signal which is an AMBA signal and the interfacing result is transmitted to the slave module (S740).

Next, it is determined whether a control signal, not an address signal or a data signal, is received from the OCN (S750). It is determined whether the control signal is received from the OCN by checking whether an FSEN signal is at a logic "1" level. That is, the FSEN signal at a logic "1" level indicates that the HWRITE signal and/or the HBURST signal has been received.

When it is determined in operation S750 that the FSEN signal is at a logic "1" level, operation S755 is performed.

When it is determined in operation S750 that the FSEN signal is at a logic "0" level, operation S760 is performed.

In operation S755, a least significant bit and the next two bits of the least significant bit of an FS signal are respectively interfaced with the HWRITE signal and the HBURST signal according to a predetermined method. However, operation S755 is not limited to the above description.

After operation S755, it is determined whether a forward data signal is received from the OCN by checking whether an FDEN signal is at a logic "1" level or a logic "0" level (S760).

If it is determined in operation S760 that the FDEN signal is at a logic "1" level, the forward data received from the OCN is interfaced with the HWDATA signal and the interfacing result is transmitted to the slave module (S765). If it is determined in operation S760 that the FDEN signal is at a logic "0" level, operation S770 is performed.

After operations S760 and S765, it is determined whether a forward tag signal is received by checking whether an FTEN signal is at a logic "1" level or a logic "0" level (S770).

If it is determined in operation S770 that the FTEN signal is at a logic "1" level, an FT signal received from the OCN is interfaced with an FT-TEMP signal and the interfacing result is transmitted to the slave module (S775). If it is determined in operation S770 that the FTEN signal is at a logic "0" level, the method is terminated. The FT_TEMP signal is an internal signal that cannot be viewed outside the slave interface module and is used as a temporary storage space when resending the FT signal using a BT signal.

Forward interfacing performed by a slave interface unit, according to an embodiment of the present invention, which is not described with reference to FIG. 7, has been described with reference to FIG. 4.

Figure 8:
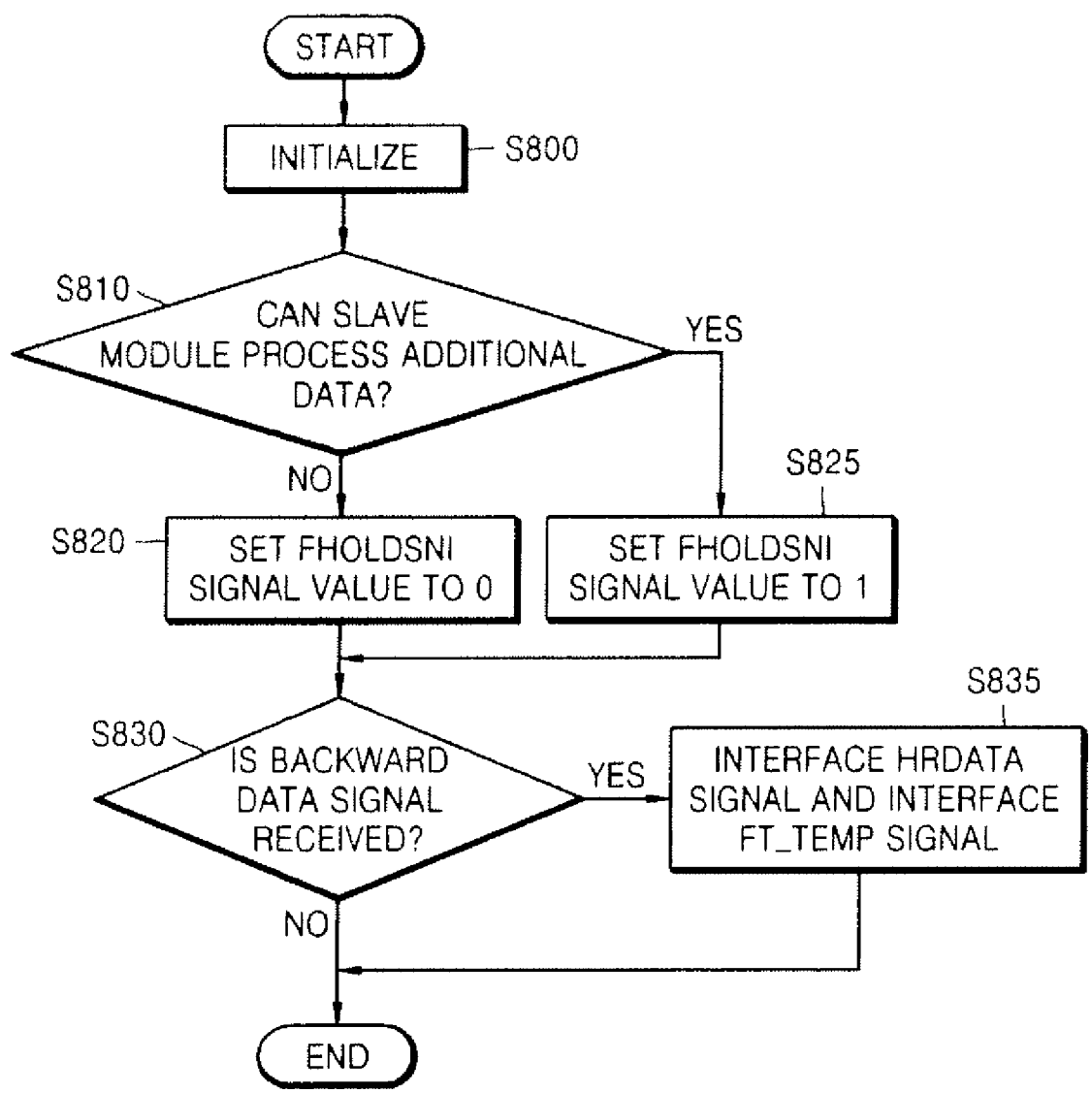
FIG. 8 is a flowchart illustrating a backward interfacing method performed by a slave interface unit, according to an embodiment of the present invention.

FIG. 8 is a flowchart illustrating a backward interfacing method performed by a slave interface unit, according to an embodiment of the present invention. Referring to FIG. 8, first, an FHOLDSNI signal, a BDEN signal, and a BTEN signal are initialized (S800).

Next, it is determined whether a slave module can process additional data by checking whether a HREADY signal is at a logic "1" level or a logic "0" level (S810). In other words, the slave module cannot process the additional data when the HREADY signal is at a logic "0" level, and can process the additional data when the HREADY signal is at a logic "1" level.

If it is determined in operation S810 that the HREADY signal is at a logic "0" level, the value of an FHOLDSNI signal is set to a logic "1" level so as to prevent an OCN from transmitting the additional data (S820). If it is determined in operation S810 that the HREADY signal is at a logic "1" level, the value of the FHOLDSNI signal is set to a logic "0" level so as to allow the OCN to transmit the additional data (S825).

After operations S820 and S825, it is determined whether backward data is received (S830). Whether the backward data is received is determined by checking whether a BDEN signal is at a logic "1" level or a logic "0" level.

If it is determined in operation S830 that the backward data is received, that is, when the BDEN signal is at a logic "1" level, an HRDATA signal received from the slave module is interfaced with a BD signal and the interfacing result is transmitted to the OCN (S840). Also, in operation S840, the value of a BTEN signal is set to a logic "1" level, and an FT-TEMP signal is interfaced with a BT signal and the interfacing result is transmitted to the OCN. If it is determined in operation S830 that the backward data is not received, that is, the BDEN signal is at a logic "0" level, the method is terminated.

Backward interfacing performed by a slave interface unit according to an embodiment of the present invention, which is not described with reference to FIG. 8, has been described with reference to FIG. 4.

The present invention can be embodied as computer readable code in a computer readable medium. The computer readable medium may be any recording apparatus capable of storing data that is read by a computer system, e.g., read-only memory (ROM), random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

As described above, in an on-chip network interfacing apparatus and method according to the present invention, the speed of communications between internal circuits of a chip can be improved, and it is possible to receive and transmit an on-chip network signal via an interface circuit without redesigning a conventional module, which is designed according to the AMBA 2.0 on-chip bus protocol, according to an on-chip network protocol.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An on-chip network protocol communications apparatus, comprising:
   a plurality of on-chip network ports;
   a switch receiving data from a first on-chip network port of the on-chip network ports and transmitting the received data to a second on-chip network port of the on-chip network ports; and
   an interface unit determining whether an on-chip network can transmit additional data by checking an FHOLDMS signal, which is an on-chip network signal, setting an FHOLDSNI signal, which prevents the on-chip network from transmitting data, according to a predetermined method when the transmission ready signal HREADY is received, converting an advanced microcontroller bus architecture (AMBA) signal received from a module, which is designed according to an AMBA on-chip bus protocol into an on-chip network signal, and outputting the on-chip network signal to the first on-chip network port; and converting the on-chip network signal received from the first on-chip network port into an AMBA signal, and outputting the AMBA signal to the module.

2. The on-chip network protocol communications apparatus of claim 1, wherein the module comprises:
   a master module requesting data for communications, using the on-chip network protocol communications apparatus; and
   a slave module receiving the request for the data which the master module requires to establish communications using the on-chip network protocol communications apparatus.

3. The on-chip network protocol communications apparatus of claim 2, wherein the interface unit comprises:
   a master interface unit converting the AMBA signal received from the master module into an on-chip network signal and outputting the on-chip network signal to the first on-chip network port, and converting the on-chip network signal received from the first on-chip network port into an AMBA signal and outputting the AMBA signal to the master module; and a slave interface unit converting an on-chip network signal received from the second on-chip network into an AMBA signal and outputting the AMBA signal to the slave module, and converting an AMBA signal received from the slave module into an on-chip network signal and outputting the on-chip network signal to the second on-chip network port.

4. The on-chip network protocol communications apparatus of claim 1, wherein each on-chip network port comprises:
an up sampler transmitting signals received from the interface unit in an order that the signals are received; and
a down sampler transmitting signals received from the switch in a reverse order that the signals are received.

5. A method of establishing communications between a master module which is designed according to an advanced microcontroller bus architecture (AMBA) on-chip bus protocol and requests data for communications, and an on-chip network, the method comprising:
(a) controlling a forward signal by determining whether an on-chip network can transmit additional data by checking an FHOLDMS signal, which is an on-chip network signal, receiving an AMBA signal from the master module, converting the AMBA signal into an on-chip network signal, and outputting the converting result to the on-chip network; and
(b) controlling a backward signal by receiving an on-chip network signal from the on-chip network, converting the on-chip network signal into an AMBA signal, and outputting the converting result to the master module.

6. The method of claim 5, wherein (a) comprises:
(a1) receiving a transmission mode signal HTRANS from the master module;
(a2) determining whether data transmission is required using the received transmission mode signal; and
(a3) when it is determined in (a2) that data transmission is required, receiving a write/read signal HWRITE, which is an AMBA signal, from the master module, converting the write/read signal HWRITE into a control signal FS which is an on-chip network signal, and outputting the converting result to the on-chip network.

7. The method of claim 6, when the signal received in (a3) is a write signal, further comprising receiving a data signal, which is an AMBA signal to be stored, from the master module, converting the data signal into a forward data signal FD, which is an on-chip network signal, and outputting the converting result to the on-chip network.

8. The method of claim 7, further comprising receiving an address signal HADDR, which is an AMBA signal, from the master module, converting the address signal into an address signal FA, which is an on-chip network signal used to write or read data, and outputting the converting result to the on-chip network.

9. The method of claim 6, when the signal received in (a3) is a read signal, further comprising receiving an address signal HADDR, which is an AMBA signal, from the master module, converting the address signal into an address signal FA which is an on-chip network signal used to write or read data, and outputting the converting result to the on-chip network.

10. The method of claim 6, before (a1), comprising:
determining whether the master module requests use of an on-chip bus; and when it is determined that the master module requests use of the on-chip bus, determining whether the on-chip network is to transmit additional data,
wherein when it is determined that the on-chip network is to transmit additional data, (a1) is performed.

11. The method of claim 6, wherein a signal used to determine whether data transmission is required in (a2) is a sequential transmission mode signal.

12. The method of claim 6, wherein a signal used to determine whether data transmission is required in (a2) is a non-sequential transmission mode signal, and
during (a3), a burst transmission signal HBURST is received together with the write/read signal HWRITE, which is an AMBA signal, from the master module, the write/read signal HWRITE and the burst transmission signal HBURST are converted into a control signal FS which is an on-chip network signal, and the converting result is output to the on-chip network.

13. The method of claim 5, wherein (b) comprises:
(b1) determining whether a backward data signal BD, which is an on-chip network signal, is received from the on-chip network; and
(b2) when it is determined in (b1) that the backward data signal is received, converting the backward data signal into a read data signal HRDATA which is an AMBA signal, and outputting the converting result to the master module.

14. A method of establishing communications between an on-chip network, and a slave module which is designed according to an advanced microcontroller bus architecture (AMBA) on-chip bus protocol and which receives a request for data required for the communications, the method comprising:
(a) controlling a forward signal by setting an FHOLDSNI signal, which prevents the on-ship network from transmitting data, according to a predetermined method when the transmission ready signal HREADY is received, receiving an on-chip network signal from the on-chip network, converting the on-chip network into an AMBA signal, and outputting the converting result to the slave module; and
(b) controlling a backward signal by receiving an AMBA signal from the slave module, converting the AMBA signal into an on-chip network signal, and outputting the converting result to the on-chip network.

15. The method of claim 14, wherein (a) comprises:
(a1) determining whether a control signal FS, which is an on-chip network signal, is received from the on-chip network; and
(a2) when it is determined in (a1) that the control signal FS is received, converting the control signal FS into the AMBA signal according to a predetermined method, and outputting the converting result to the slave module.

16. The method of claim 15, wherein in the predetermined method in (a2), a least significant bit of the control signal FS is converted into a write/read signal HWRITE which is an AMBA signal, and the converting result is output to the slave module.

17. The method of claim 15, wherein in the predetermined method of (a2), a least significant bit of the control signal FS is converted into a write/read signal HWRITE which is an AMBA signal, and
next two bits of the least significant bit of the control signal is converted into a burst transmission mode signal which is an AMBA signal.

18. The method of claim 15, further comprising determining whether a forward data signal FD, which is an on-chip network signal, is received from the on-chip network, and converting the forward data signal FD into a data signal HWDATA, which is an AMBA signal to be stored, when it is determined that the forward data signal FD is received.

19. The method of claim 15, further comprising determining whether a forward tag signal FT, which is an on-chip network signal, is received from the on-chip network, and converting the forward tag signal FT into a data signal FT_TEMP, which is used to temporarily store the forward tag signal, when it is determined that the forward tag signal FT is received.

20. The method of claim 15, before (a1), comprising:
determining whether the on-chip network is to transmit additional data; and
when it is determined that the on-chip network is to transmit additional data, determining whether the slave module is to receive and process the additional data,
wherein, when it is determined that the slave module is to receive and process the additional data, (a1) is performed.

21. The method of claim 15, wherein (b) comprises:
(b1) determining whether a read data signal HRDATA, which is an AMBA signal, is received from the slave module; and
(b2) when it is determined in (b1) that the read data signal HRDATA is received, converting the read data signal HRDATA into the backward data signal BD which is an on-chip network signal, and outputting the interfacing result to the on-chip network.

22. The method of claim 21, before (b1), further comprising determining whether a transmission ready signal HREADY, which is an AMBA signal, is received from the slave module.

* * * * *